United States Patent [19]
Radigan

[11] Patent Number: 6,108,912
[45] Date of Patent: Aug. 29, 2000

[54] DUST COLLECTING SHIELD FOR POWER TOOLS

[76] Inventor: Michael C. Radigan, 13 Heller Hill Rd., Blainstown, N.J. 07825

[21] Appl. No.: 09/220,031

[22] Filed: Dec. 23, 1998

[51] Int. Cl.[7] .................................................. B08D 7/02
[52] U.S. Cl. ................................ 30/124; 30/390; 451/456
[58] Field of Search ................. 30/124, 390; 144/252.1; 451/453, 456

[56] References Cited

U.S. PATENT DOCUMENTS

| | | | |
|---|---|---|---|
| 2,789,404 | 4/1957 | Downing et al. | 451/456 |
| 3,882,598 | 5/1975 | Earle et al. | 30/390 |
| 4,192,104 | 3/1980 | Patenaude | 451/456 |
| 4,466,187 | 8/1984 | Morimoto | 30/390 |
| 5,033,192 | 7/1991 | Franz et al. | 30/124 |
| 5,074,044 | 12/1991 | Duncan et al. | 30/124 |
| 5,084,972 | 2/1992 | Waugh | 30/124 |
| 5,327,649 | 7/1994 | Skinner | 30/124 |
| 5,445,056 | 8/1995 | Folci | 30/124 |

*Primary Examiner*—Hwei-Siu Payer
*Attorney, Agent, or Firm*—Goldstein & Canino

[57] ABSTRACT

A dust collecting shield for power tools including a housing adapted for coupling with a power tool. The housing has a generally semi-circular configuration. The housing is defined by a front face, a rear face, and an upper peripheral side wall therebetween. The housing has an open lower end. The front face has an opening therethrough. The rear face is adapted for coupling with a shaft of a power tool. The housing includes a lower peripheral side wall disposed inwardly of the upper peripheral side wall whereby a channel is disposed between the upper and lower peripheral side walls. The lower peripheral side wall has apertures through forward and rearward portions thereof exposing the channel. The upper peripheral side wall has an aperture therethrough exposing the channel. A tube extends outwardly of the aperture in the upper peripheral side wall of the housing. An upper end of the tube is adapted for coupling with a vacuum hose.

7 Claims, 2 Drawing Sheets

DUST COLLECTING SHIELD FOR POWER TOOLS

BACKGROUND OF THE INVENTION

The present invention relates to a dust collecting shield for power tools and more particularly pertains to collecting dust generated by a power tool and providing for easy removal of the dust with a dust collecting shield for power tools.

Hand-held power tools, such as grinders and saws are widely used in the construction industry. Such tools typically embody rotating cutting members, such as circular grinding wheels and blades that are typically rotated at several thousand revolutions per minute. These tools are used to cut plaster, ducting, tile and various other materials. During the cutting operation, particles resulting from the cut are expelled at high velocity into the surrounding environment presenting a substantial hazard to the operator and causing the contamination of tools and other articles that may located adjacent to the work area. Most commercially available hand-held power tools, such as grinders are provided with guards that cover a portion of the rotating cutting element and protect the operator from contacting the cutting element during cutting operations. However, these guards are totally ineffective in controlling dust contamination. The present invention provides an effective guard for flying debris while at the same time provides means for the removal of dust.

The use of dust collecting apparatuses is known in the prior art. More specifically, dust collecting apparatuses heretofore devised and utilized for the purpose of collecting dust are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,440,809 to Padilla discloses a dust collection device comprised of a vacuum tube, for use with a variety of hand held power tools, such as high speed grinders and saws. U.S. Pat. No. 3,934,661 to Sauerwein discloses a dust collector or dust cup adapted for use in drilling or other material deforming operations. U.S. Pat. No. 3,936,213 to Kappel discloses a device for use with drills or the like for the collection of working debris. U.S. Pat. No. 4,214,317 to Kelley, Sr. discloses apparel protective against debris during working.

While these devices fulfill their respective, particular objective and requirements, the aforementioned patents do not describe a dust collecting shield for power tools for collecting dust generated by a power tool and providing for easy removal of the dust.

In this respect, the dust collecting shield for power tools according to the present invention substantially departs from the conventional concepts and designs of the prior art, and in doing so provides an apparatus primarily developed for the purpose of collecting dust generated by a power tool and providing for easy removal of the dust.

Therefore, it can be appreciated that there exists a continuing need for new and improved dust collecting shield for power tools which can be used for collecting dust generated by a power tool and providing for easy removal of the dust. In this regard, the present invention substantially fulfills this need.

SUMMARY OF THE INVENTION

In the view of the foregoing disadvantages inherent in the known types of dust collecting apparatuses now present in the prior art, the present invention provides an improved dust collecting shield for power tools. As such, the general purpose of the present invention, which will be described subsequently in greater detail, is to provide a new and improved dust collecting shield for power tools and method which has all the advantages of the prior art and none of the disadvantages.

To attain this, the present invention essentially comprises a housing adapted for coupling with a power tool. The housing has a generally semi-circular configuration. The housing is defined by a front face, a rear face, and an upper peripheral side wall therebetween. The housing has an open lower end. The upper peripheral side wall has a forward portion, a rearward portion and an intermediate portion therebetween. The front face has an opening therethrough. The rear face has an opening therethrough with apertures therethrough around the opening. The opening in the rear face couples with a shaft of a power tool whereby the apertures receive hardware for coupling with the power tool. The housing includes a lower peripheral side wall disposed inwardly of the upper peripheral side wall whereby a channel is disposed between the upper and lower peripheral side walls. The lower peripheral side wall has apertures through forward and rearward portions thereof exposing the channel. The intermediate portion of the upper peripheral side wall has an aperture therethrough exposing the channel. A transparent lid is hingedly secured to the front face of the housing. The lid selectively covers the opening through the front face. The lid has a pair of threaded members extending therethrough for engaging the front face in a locked orientation. A tube extends outwardly of the aperture in the intermediate portion of the upper peripheral side wall of the housing. An upper end of the tube is adapted for coupling with a vacuum hose. A wheel is rotatably coupled with the open lower end of the housing inwardly of the forward portion of the upper peripheral side wall.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dust collecting shield for power tools which has all the advantages of the prior art dust collecting apparatuses and none of the disadvantages.

It is another object of the present invention to provide a new and improved dust collecting shield for power tools which may be easily and efficiently manufactured and marketed.

It is a further object of the present invention to provide a new and improved dust collecting shield for power tools which is of durable and reliable construction.

An even further object of the present invention is to provide a new and improved dust collecting shield for power tools which is susceptible of a low cost of manufacture with regard to both materials and labor, and which accordingly is then susceptible of low prices of sale to the consuming public, thereby making such a dust collecting shield for power tools economically available to the buying public.

Even still another object of the present invention is to provide a new and improved dust collecting shield for power tools for collecting dust generated by a power tool and providing for easy removal of the dust.

Lastly, it is an object of the present invention to provide a new and improved dust collecting shield for power tools including a housing adapted for coupling with a power tool. The housing has a generally semi-circular configuration. The housing is defined by a front face, a rear face, and an upper peripheral side wall therebetween. The housing has an open lower end. The front face has an opening therethrough. The rear face is adapted for coupling with a shaft of a power tool. The housing includes a lower peripheral side wall disposed inwardly of the upper peripheral side wall whereby a channel is disposed between the upper and lower peripheral side walls. The lower peripheral side wall has apertures through forward and rearward portions thereof exposing the channel. The upper peripheral side wall has an aperture therethrough exposing the channel. A tube extends outwardly of the aperture in the upper peripheral side wall of the housing. An upper end of the tube is adapted for coupling with a vacuum hose.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
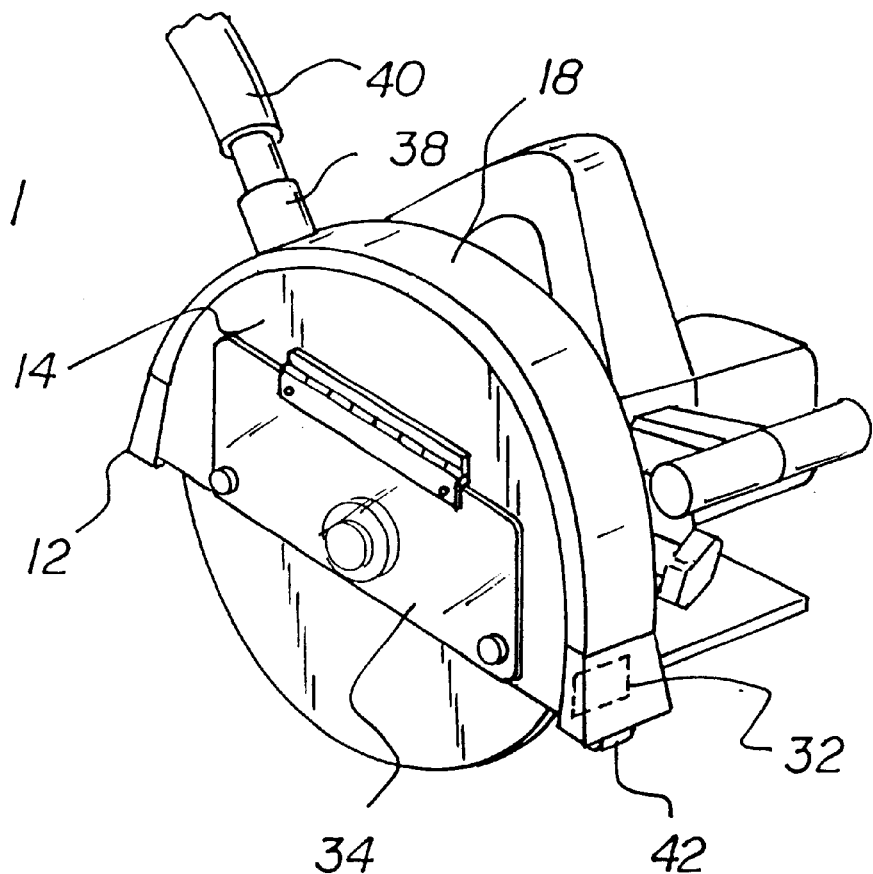
FIG. 1 is a perspective view of the preferred embodiment of the dust collecting shield for power tools constructed in accordance with the principles of the present invention.
Figure 2:
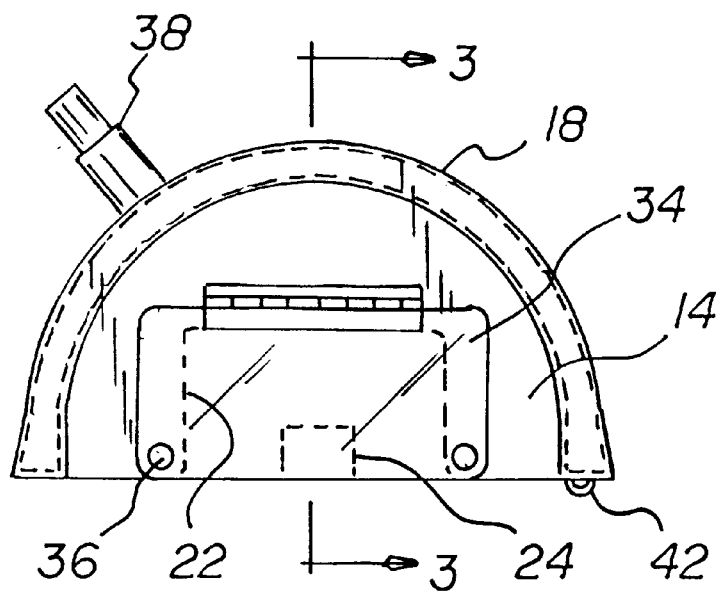
FIG. 2 is a side elevation view of the present invention.
Figure 3:
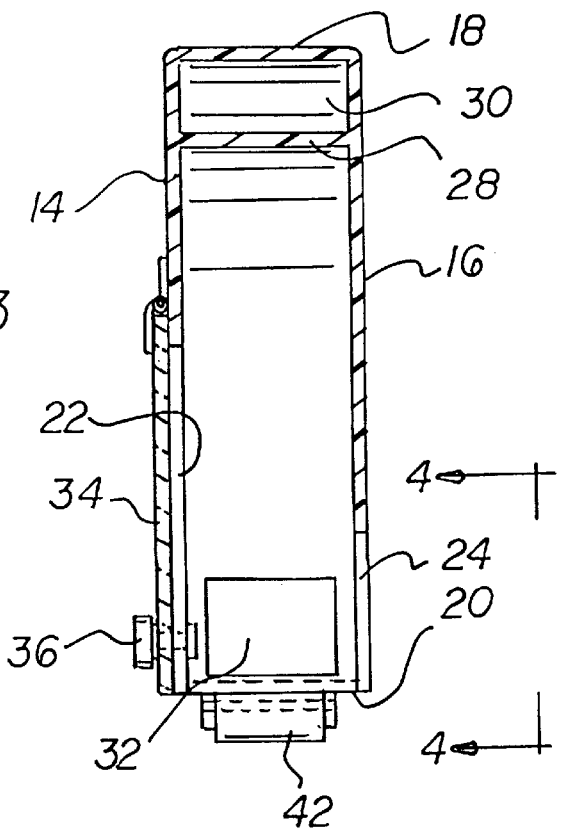
FIG. 3 is a cross-sectional view of the present invention as taken along line 3—3 of FIG. 2.
Figure 4:
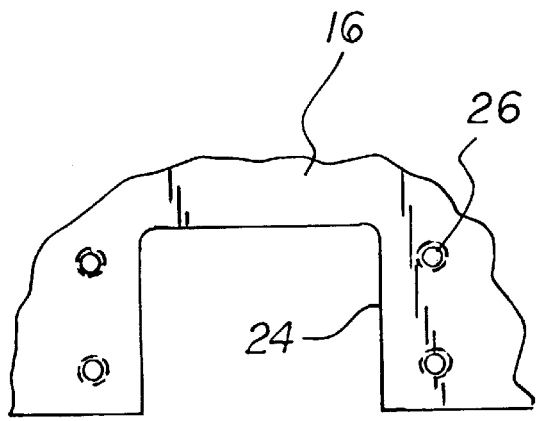
FIG. 4 is a rear view of the present invention as taken along line 4—4 of FIG. 3.

With reference now to the drawings, and in particular, to FIGS. 1 through 5 thereof, the preferred embodiment of the new and improved dust collecting shield for power tools embodying the principles and concepts of the present invention.

Specifically, it will be noted in the various Figures that the device relates to a dust collecting shield for power tools for collecting dust generated by a power tool and providing for easy removal of the dust. In its broadest context, the device consists of a housing, a transparent lid, a tube, and a wheel. Such components are individually configured and correlated with respect to each other so as to attain the desired objective.

The housing 12 is adapted for coupling with a power tool, such as a power saw or other tool with a rotating blade or wheel. The housing 12 has a generally semi-circular configuration. The housing 12 is defined by a front face 14, a rear face 16, and an upper peripheral side wall 18 therebetween. The housing 12 has an open lower end 20. The upper peripheral side wall 18 has a forward portion, a rearward portion and an intermediate portion therebetween. The front face 14 has an opening 22 therethrough. The rear face 16 has an opening 24 therethrough with apertures 26 therethrough around the opening 24. The opening 24 in the rear face 16 couples with a shaft of a power tool whereby the apertures 26 receive hardware for coupling with the power tool. The housing 12 includes a lower peripheral side wall 28 disposed inwardly of the upper peripheral side wall 18 whereby a channel 30 is disposed between the upper and lower peripheral side walls 18,28. The lower peripheral side wall 28 has apertures 32 through forward and rearward portions thereof exposing the channel 30. The intermediate portion of the upper peripheral side wall 18 has an aperture therethrough exposing the channel 30.

The transparent lid 34 is hingedly secured to the front face 14 of the housing 12. The lid 34 selectively covers the opening 22 through the front face 14. The lid 34 has a pair of threaded members 36 extending therethrough for engaging the front face 14 in a locked orientation.

The tube 38 extends outwardly of the aperture in the intermediate portion of the upper peripheral side wall 18 of the housing 12. An upper end of the tube 38 is adapted for coupling with a vacuum hose 40. Once the vacuum is activated and the power tool is in use, the debris and dust generated by the tool will be collected within the housing 12. The suction from the vacuum will draw the debris and dust out of the housing 12 through the apertures 32 in the lower peripheral side wall 28 and into the channel 30 thereby allowing for the direct dispelling through the tube 38 and into the vacuum.

The wheel 42 is rotatably coupled with the open lower end 20 of the housing 12 inwardly of the forward portion of the upper peripheral side wall 18.

Figure 5:
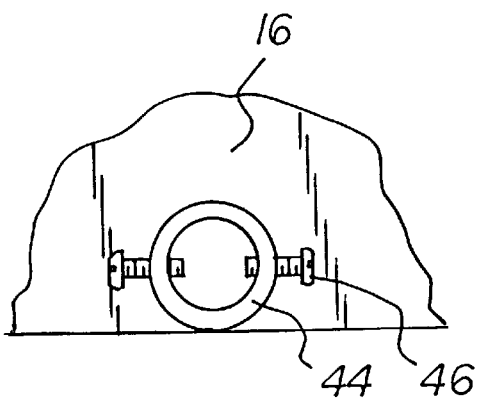
FIG. 5 is a rear view of the present invention illustrated with the optional collar mount thereof.

In FIG. 5, the opening 24 in the rear face 16 has a collar 44 extending outwardly therefrom. The collar 44 receives a shaft of a power tool therein. The collar 44 includes a pair of locking bolts 46 extending inwardly thereof for engaging the shaft. The collar 44 would be used for smaller power tools, such as small grinders.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. A dust collecting shield for power tools for collecting dust generated by a power tool and providing for easy removal of the dust comprising, in combination:

a housing adapted for coupling with a power tool, the housing having a generally semi-circular configuration, the housing being defined by a front face, a rear face, and an upper peripheral side wall therebetween, the housing having an open lower end, the upper peripheral side wall having a forward portion, a rearward portion and an intermediate portion therebetween, the front face having an opening therethrough, the rear face having an opening therethrough with apertures therethrough around the opening of the rear face, the opening in the rear face coupling with a shaft of a power tool whereby the apertures receive hardware for coupling with the power tool, the housing including a lower peripheral side wall disposed inwardly of the upper peripheral side wall whereby a channel is disposed between the upper and lower peripheral side walls, the lower peripheral side wall having apertures through forward and rearward portions thereof exposing the channel, the intermediate portion of the upper peripheral side wall having an aperture therethrough exposing the channel;

a transparent lid hingedly secured to the front face of the housing, the lid selectively covering the opening through the front face, the lid having a pair of threaded members extending therethrough for engaging the front face in a locked orientation;

a tube extending outwardly of the aperture in the intermediate portion of the upper peripheral side wall of the housing, an upper end of the tube being adapted for coupling with a vacuum hose;

a wheel rotatably coupled with the open lower end of the housing inwardly of the forward portion of the upper peripheral side wall.

2. A dust collecting shield for power tools for collecting dust generated by a power tool and providing for easy removal of the dust comprising, in combination:

a housing adapted for coupling with a power tool, the housing having a generally semi-circular configuration, the housing being defined by a front face, a rear face, and an upper peripheral side wall therebetween, the housing having an open lower end, the front face having an opening therethrough, the rear face being adapted for coupling with a power tool, the housing including a lower peripheral side wall disposed inwardly of the upper peripheral side wall whereby a channel is disposed between the upper and lower peripheral side walls, the lower peripheral side wall having apertures through forward and rearward portions thereof exposing the channel, the upper peripheral side wall having and aperture therethrough exposing the channel;

a tube extending outwardly of the aperture in the upper peripheral side wall of the housing, an upper end of the tube being adapted for coupling with a vacuum hose.

3. The dust collecting shield for power tools as set forth in claim 2 wherein the rear face of the housing has an opening therethrough with apertures therethrough around the opening of the rear face, the opening in the rear face coupling with a shaft of a power tool whereby the apertures receive hardware for coupling with the power tool.

4. The dust collecting shield for power tools as set forth in claim 2 wherein the rear face of the housing has an aperture therethrough with a collar extending outwardly therefrom, the collar receiving a shaft of a power tool therein, the collar including a pair of locking bolts extending inwardly thereof for engaging the shaft.

5. The dust collecting shield for power tools as set forth in claim 2 and further including a transparent lid hingedly secured to the front face of the housing, the lid selectively covering the opening through the front face.

6. The dust collecting shield for power tools as set forth in claim 5 wherein the lid has a pair of threaded members extending therethrough for engaging the front face in a locked orientation.

7. The dust collecting shield for power tools as set forth in claim 2 and further including a wheel rotatably coupled with the open lower end of the housing inwardly of the forward portion of the upper peripheral side wall.

* * * * *